March 28, 1944.  C. G. HALL  2,345,043
FISHING CATAPULT
Filed March 11, 1941
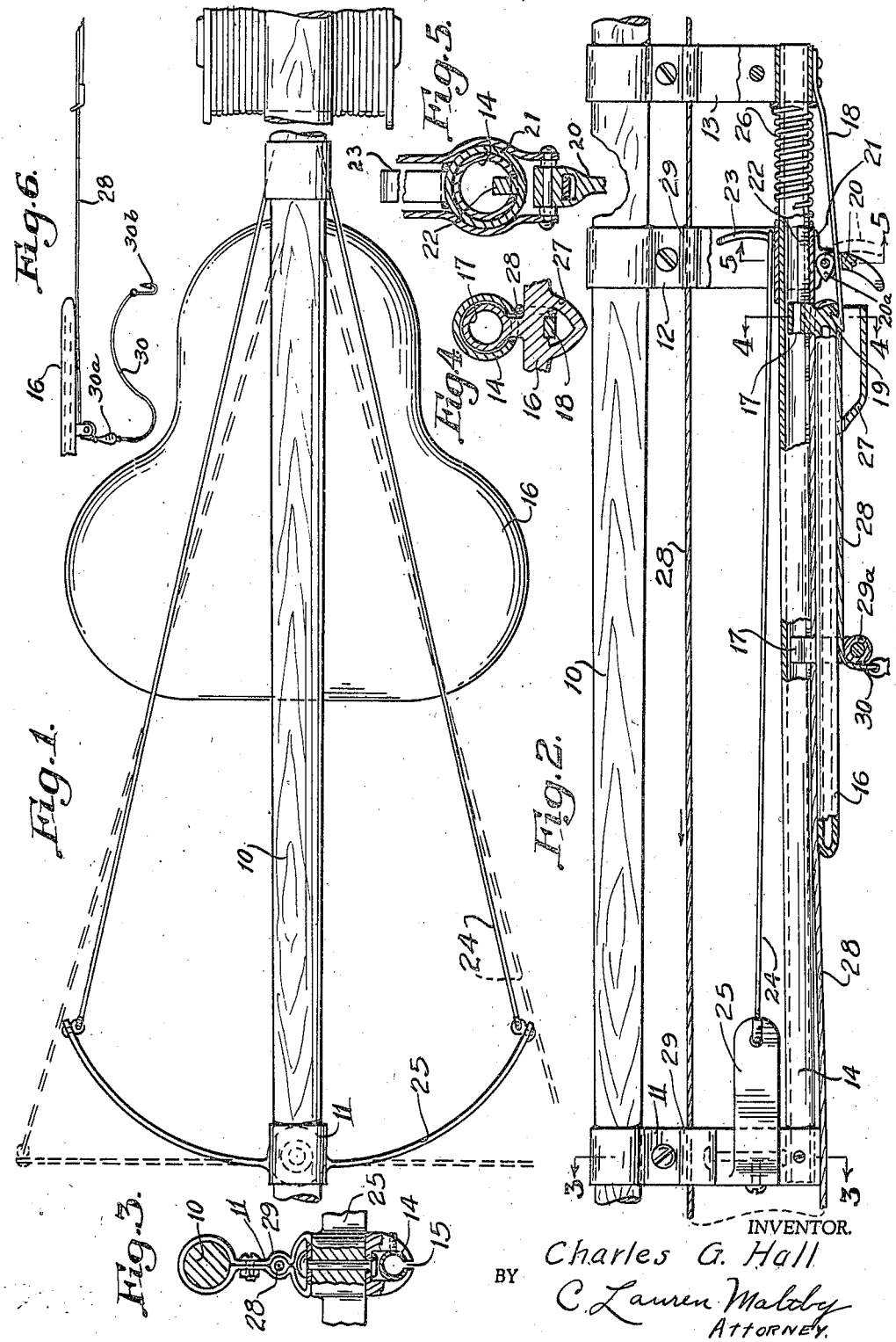
INVENTOR.
Charles G. Hall
BY C. Lauren Maltby
ATTORNEY.

Patented Mar. 28, 1944

2,345,043

UNITED STATES PATENT OFFICE 2,345,043

FISHING CATAPULT

Charles G. Hall, Los Angeles, Calif.

Application March 11, 1941, Serial No. 382,763

7 Claims. (Cl. 43—19)

This invention relates to fishing accessories and more especially to a casting catapult.

An object of the invention is to provide a simple, practical and efficient catapult of the character described.

Another object of the invention is to provide a fishing catapult adapted to increase the normal casting range.

Another object of the invention is to provide a casting catapult particularly adapted to be used where limited space is available.

A further object of the invention is to provide a fishing catapult adapted for improved means for trolling.

A further object is to provide a glider float wherein the line is adapted to be lowered a predetermined distance after the float strikes the water.

Other objects and advantages will appear and be brought out more fully in the following specification, reference being had to the accompanying drawing, wherein:

Fig. 1 is a plan view of a portion of a fishing rod showing my catapult construction;

Fig. 2 is an elevation view of the same;

Fig. 3 is a sectional view taken along line 3—3 of Fig. 2;

Fig. 4 is a sectional view taken along line 4—4 of Fig. 2;

Fig. 5 is a sectional view taken along line 5—5 of Fig. 2;

Fig. 6 is a fragmentary view showing a detail of the float and line connection.

Referring more particularly to the drawing, I show a fishing pole or rod 10, to which are secured brackets 11, 12, and 13, which support a tubular guide channel or track 14 which has a slot 15 extending the length thereof in the lower side. A float member 16 is provided with a pair of bracket shoes 17, adapted to be slidable within tube 14 and support the float member 16 when associated therewith.

A spring hook 18 secured to bracket 13 is adapted to engage a notch 19 on float 16 and a trigger 20 is pivotally mounted on bracket 12 and has a cam 20a to disengage hook 18 for releasing the catapult float 16. A sleeve member 21 is mounted on tubular member 14 and has a portion 22 within the tubular track portion thereof and adapted to engage the rear shoe member 17.

A post 23 extends upwardly from the top of member 21 and is adapted for engagement with a cord 24, the ends of which are secured to the ends of a pair of spring bows 25 suitably secured to bracket 11. A spring 26 is positioned on tubular guide channel 14 and is compressed by the member 21 and bracket 13. Float member 16 is provided with a rudder fin 27.

I show a line 28 which is adapted to pass through loops 29 formed in brackets 11, 12, and 13. The line passes over the float, as shown in Fig. 2, and under it and over a pulley 29a secured to the under side of the float from which the weighted hook portion 30 passes downwardly into the water. Line 28 has a stop weight 30a on portion 30 some distance from the hook 30b to engage pulley 29a for trolling.

Having described my invention, what I claim is:

1. A fishing catapult as described comprising a rod, a guide track on said rod, a float having track engaging shoes and a line pulley, a line for said rod adapted to pass over said pulley, and means to project the float from said guide track.

2. A fishing catapult as described comprising a rod, a guide track on said rod, a float having track engaging shoes and a line pulley, a line for said rod adapted to pass over said pulley, means to project the float from said guide track, and a resilient element having means to engage said float.

3. A fishing catapult as described comprising a rod, a guide track on said rod, a float having track engaging shoes and a line pulley, a line for said rod adapted to pass over said pulley, means to project the float from said guide track, said means including a slidable element on said guide track, and a resilient element adapted to engage said float.

4. A fishing catapult as described comprising a rod, a guide track on said rod, a float having track engaging shoes and a line pulley, a line for said rod adapted to pass over said pulley, means to project the float from said guide track, and means adapted to releasably retain said float on said guide track.

5. A fishing catapult as described comprising a rod, a plurality of brackets secured to said rod, a channeled guide track supported by said brackets, a winged glider float having guide track shoes adapted for slidable engagement with said guide track, a float projecting means slidably positioned on said guide track adjacent one end thereof, said means including a spring element and a sleeve element, a retaining hook secured to said guide track and adapted to normally retain said float on said guide track, a cross-bow secured to one of said brackets, and having a cord adapted to engage said sleeve element, a trigger adapted to release said hook from said float, a pulley on the under side of said float, and a fishing line adapted to pass over said pulley.

6. A line carrying glider plane float as described adapted to be projected from a fishing rod and having a rudder fin, said float having a pulley on the under side thereof adapted to guide a fishing line thereon, said pulley being adapted to retain the line hook at a predetermined depth.

7. A line carrying glider plane float as described adapted to be projected from a fishing rod, having a line guide pulley on the under side thereof, and a fishing line adapted to be passed over said pulley and having a stop engagement with said float when the bait hook is at a predetermined distance from said float for trolling.

CHARLES G. HALL.